United States Patent [19]

Revesz et al.

[11] Patent Number: 4,962,466
[45] Date of Patent: Oct. 9, 1990

[54] ELECTRONIC PRODUCT INFORMATION DISPLAY SYSTEM

[75] Inventors: Michael S. Revesz, Carrollton; Harold G. Burkett, Jr., Lewisville; Robert C. Gilbert, Richardson, all of

[73] Assignee: Viscom Systems, Inc., Dallas, Tex.

[21] Appl. No.: 453,816

[22] Filed: Dec. 19, 1989

Related U.S. Application Data

[63] Continuation of Ser. No. 31,396, Mar. 27, 1987, Pat. No. 4,888,709.

[51] Int. Cl.⁵ .............................................. G06F 15/16
[52] U.S. Cl. ...................................... 364/518; 455/604
[58] Field of Search .............................. 364/518, 521; 340/825.06, 825.07, 825.15, 825.35; 235/378, 383, 385, 454; 358/194.1, 113, 149; 455/603, 604

[56] References Cited

U.S. PATENT DOCUMENTS

| | | | |
|---|---|---|---|
| 3,637,989 | 1/1972 | Howard et al. | 235/61.7 |
| 4,002,886 | 1/1977 | Sundelin | 235/61.7 |
| 4,139,149 | 2/1979 | Crepeau et al. | 235/383 |
| 4,180,204 | 12/1979 | Koenig et al. | 235/385 |
| 4,426,662 | 1/1984 | Skerlos et al. | 358/194 |
| 4,500,880 | 2/1985 | Gomersall et al. | 340/825 |
| 4,521,677 | 6/1985 | Sarwin | 235/385 |
| 4,566,034 | 1/1986 | Harger et al. | 358/194.1 |
| 4,703,451 | 10/1987 | Calabrese | 364/900 |
| 4,727,475 | 2/1988 | Kiremidjian | 364/200 |

*Primary Examiner*—Gary V. Harkcom
*Assistant Examiner*—H. R. Herndon

[57] ABSTRACT

An electronic product information display system includes a plurality of self-contained display modules (10) mounted proximate to respective products. A signal (22) is formed that comprises an address part and a data part, the adderess part corresponding to a selected module address and the data part encoding product information (18, 20) to be displayed by the addressed module (10). The signal a broadcast from a transmitter (24) remote from a plurality of modules (10). Modules (10) each receive the signal, decode the address part into a received address, and decode the data part into product information (18, 20). The product information is stored and displayed responsive to a match between the module address and the received address. The signal (22) is preferably infrared.

8 Claims, 3 Drawing Sheets

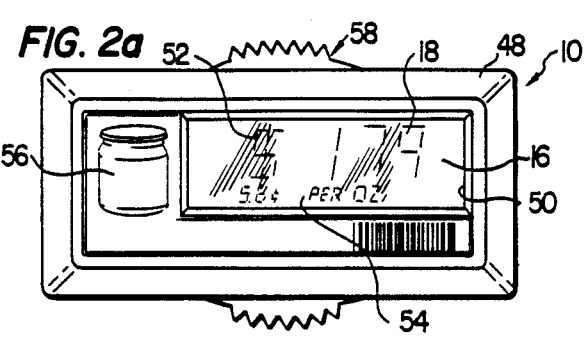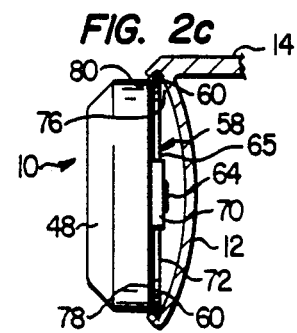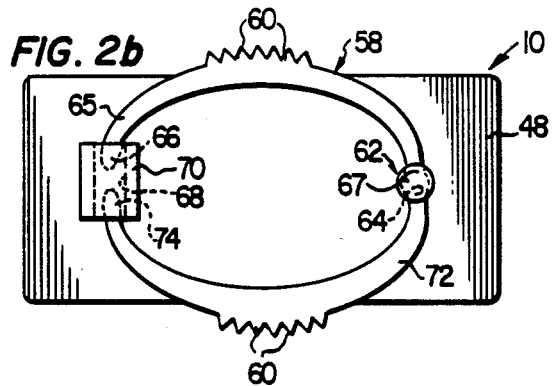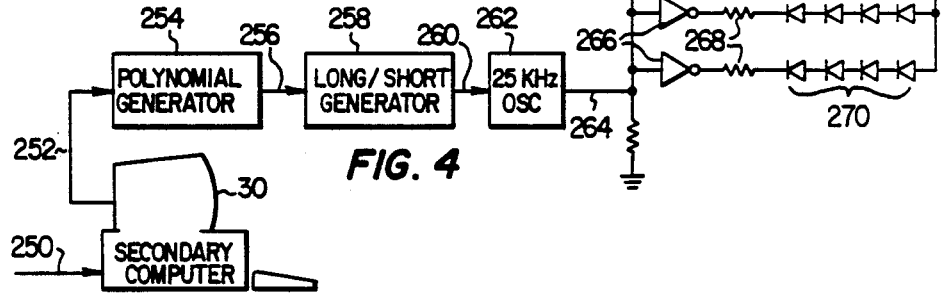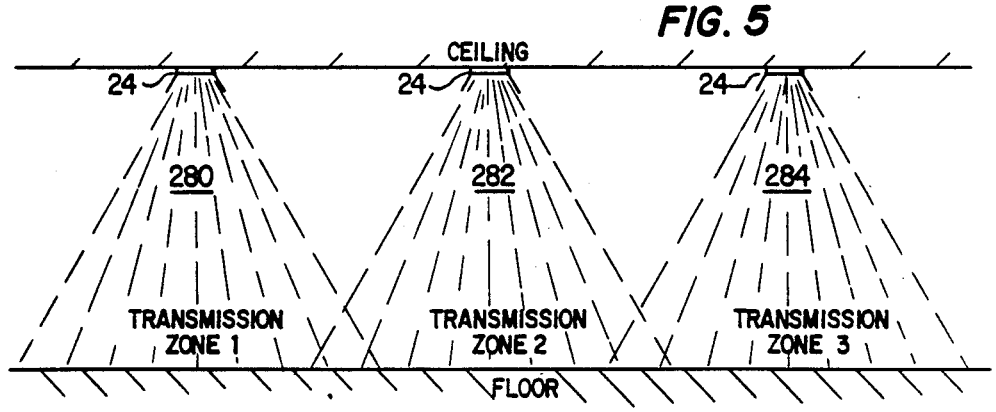

ELECTRONIC PRODUCT INFORMATION DISPLAY SYSTEM

RELATED APPLICATION

This application is a continuation of co-pending U.S. Patent Application Serial No. 07/031,396 filed Mar. 27, 1987 (Attorney's Docket No. 50490-11) assigned to Viscom Systems, Inc., the assignee of this invention now U.S. Pat. No. 4,888,709.

TECHNICAL FIELD OF THE INVENTION

This invention relates in general to retail product display and device control systems, and more particularly relates to an electronic pricing, advertising and control system using infrared transmission.

BACKGROUND OF THE INVENTION

Manual shelf or item pricing has been the traditional method of informing consumers about the prices of a large number of different goods in retail stores. By this time-honored method, the prices are marked on the shelves, on the products themselves, or in other areas where the goods are displayed.

In the context of today's increased numbers of products, tighter inventory control and tighter profit margins, problems have arisen in this traditional system when the prices of the goods change. Changing the price of particular goods manually causes significant delays in price updating and potential errors in product pricing. Even in modern retail chain establishments such as modern grocery stores, a delay occurs when price updates from a regional headquarters are electronically communicated to the individual stores checkout scanner data base, but then cannot be made effective until new shelf price labels arrive from the printer and are manually dispersed to the relevant product shelf locations. Such delays have been shown to typically run from four to five days and sometimes exceed seven days from the time a price change decision is made at the regional level.

Product pricing errors also occur when the printed shelf price labels do not match the price contained in the store's checkout scanner price data base. This price mismatch has been a principal source of customer complaint and discontent. Further, the need to continually and manually update shelf pricing labels by the printing process limits the amount and quality of product information which can be placed on a shelf label. Store customers often have a difficult time matching a product with a totally computer-generated shelf price label that has only a UPC code, a block-letter description and a price. When customers cannot find a shelf price label for a given product, they may not purchase the product, or may again become dissatisfied with the store.

More recently, several schemes have been suggested for creating electronic shelf pricing information modules. These systems almost invariably involve a hardwire connection from the individual electronic display modules to a central store computer, or via an interim link. Not surprisingly, the expense associated with installing and maintaining such hardwire systems has precluded their economic viability.

A need therefore exists in the industry to replace a large majority of the printing and manual label placement activity in the current price change cycle by an electronic method that is inexpensive and flexible enough to be economically viable. A further need exists in the industry to tie the shelf price into an electronically updated check-out scanner price data base, particularly as maintained in an off-site regional computer. Yet another need in the industry has arisen for quick and economical distribution of non-pricing information for each product, such as facts about the product or notices of special sales.

SUMMARY OF THE INVENTION

The present invention comprises a method and apparatus for implementing an electronic pricing system using light signals from a remote transmitter. In a preferred embodiment, a plurality of electronic display modules are mounted proximate to respective products. Each module is programmed with a module address. When it is desired to change product information displayed by a particular module, a signal is formed comprising an address part and a data part, the address part representing a particular module address and the data part representing product information associated with the address. The first and second parts may be assembled in sequential or in reverse order. The signal as thus formed is broadcasted to a plurality of modules. The modules receive the signal and decode the address part of the signal into a received address and the data part of the signal into associated product information. The received address is compared to a preprogrammed module address to determine if a match exists. If a match exists, the product information is placed in the module's memory. It is from there available for use in the module display.

In a preferred embodiment, the signal is an infrared signal that is received by an infrared receiving diode or phototransistor mounted in the interior of a module case. At least a portion of the module case is at least partly transparent to infrared radiation.

In an alternate embodiment, the module may include ports for communicating with an associated electrical device, including outputs for controlling the device and inputs for receiving and monitoring a controlled variable parameter therefrom. Such electrical devices typically include ultimate control units, such as refrigerators or freezer cases. The modules further have a memory for storing received information from the controlled device, and one or more transmitting infrared diodes for transmitting an infrared signal back to a receiver. This receiver may in certain instances be a central receiver, or may be a satellite repeater that retransmits the signal to a central receiver, or may be one of a plurality of receivers hardwired to a central unit.

BRIEF DESCRIPTION OF THE DRAWINGS

The invention and its advantages will be more perfectly understood with reference to the following detailed description taken in conjunction with the appended drawings in which:

FIG. 2a is a front elevational view of an electronic display module according to the invention;

FIG. 2b is a rear elevational view of the electronic display module shown in FIG. 2a;

FIG. 2c is a side elevational view of the 15 electronic display module shown in FIG. 2a, further showing a preferred method of the module's attachment to a shelf channel;

FIG. 4 is an electrical schematic block diagram of infrared transmission circuitry according to the invention; and FIG. 5 is a schematic diagram of the placement of several infrared transmitters according to the invention in a retail store in order to transmit to respective transmission zones.

DETAILED DESCRIPTION OF THE INVENTION

Figure 1:
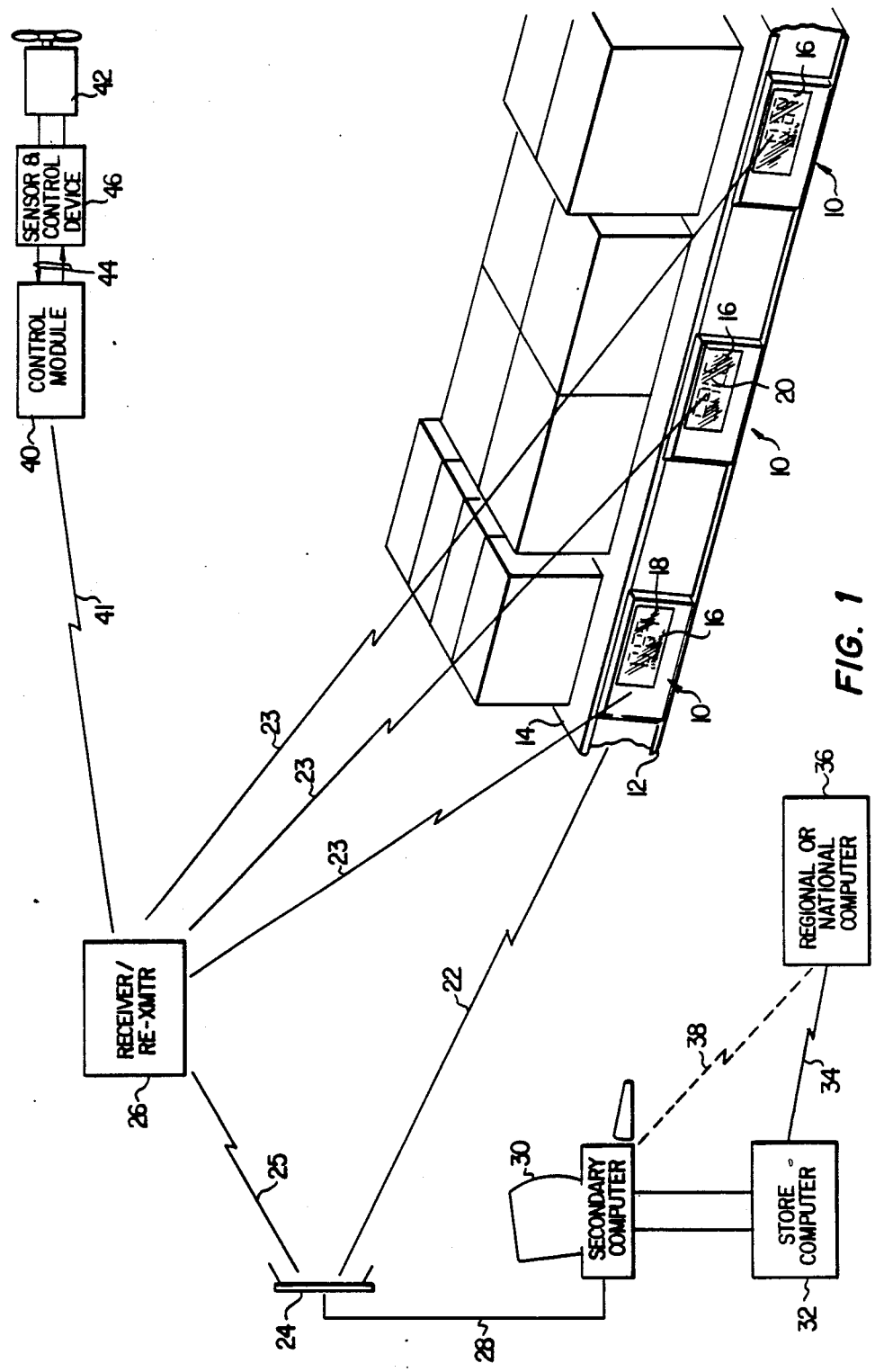
FIG. 1 is a pictorial and diagrammatic representation of an electronic product information display and device control system according to the invention.

Referring first to FIG. 1 of the drawings, an electronic product information display and device control system according to the invention is schematically illustrated, as used in a grocery store. The system can as easily be employed in other types of stores or warehouses. A plurality of modules 10 are each mounted, in a manner to be later described, on shelf channels 12 (one shown). Each channel 12 is in turn mounted by conventional means to a shelf 14 on which respective products for sale (or rent) are placed. Other conventional methods of mounting displays can be used, so long as each module 10 is mounted close to the items offered for sale. Each display module 10 has a display 16 in which product information such as price or other information is displayed. As shown, one such module is presently displaying pricing information 18, while an adjacent module is displaying alternate information 20, in this case a "SALE" notice. In a preferred embodiment, each module 10 is operable to intermittently display pricing information 18 and alternate information 20.

Each module is preferably self contained. Modules 10 receive information by electromagnetic signals such as infrared or light signals 22. Infrared or light signals are preferred over radio-frequency signals, as RF signals may have interference problems and are subject to licensing requirements. Signals 22 link modules 10 with a preferably conical infrared transmitter/receiver 24. Alternatively, infrared signals 23 may be used to link modules 10 with a receiver/retransmitter 26. Infrared transmitter/receiver 24 comprises a plurality of infrared diodes (not shown) arranged so as to focus a transmitted infrared signal to a particular zone in the store, as will be later described. In the case of relatively small stores, transmitter/receiver 24 may be mounted in or near the ceiling in the center of the store, and receiver/retransmitter 26 may be omitted. Transmitter/receiver 24 may also be mounted on a wall, and transmit to and receive from the zone by bouncing signals 22 off of the ceiling and other surfaces. In the case of a larger store, conical transmitter/receiver 24 may be mounted at one location in the store that can communicate by bounce or line of sight by signal 25, or by wire, to several receiver/retransmitters 26 mounted in spaced relationship from each other. Sufficient numbers of receivers/retransmitters 26 and the transmitter 24 should be provided in order to be able to transmit data to all modules 10. Alternatively, several receiver/transmitters 24 can be distributed throughout the store and hardwired back to a central unit such as the store computer described below.

A link 28, which preferably is a hardwire 25 connection, connects transmitter/receiver 24 with a secondary computer 30. Secondary computer 30 includes circuitry, later described, which translates digital signals into an analog infrared signal. Secondary computer 30 is further linked to a store computer 32 in which the current product information for the items is stored. A telephone line, satellite, microwave or radio frequency link 34 may connect store computer 32 with a regional or national headquarters computer 36. Regional computer 36 may transmit product information to store computer 32 or such information can be entered at the retail store. Store computer 32 stores the information according to a plurality of UPC, or more preferably EAN, address codes, one for each product offered for sale.

Product information and pricing typically varies from time to time, and requires periodic updating. The information may be uploaded from regional computer 36 into store computer 32. Then, the pricing information can be transmitted periodically to modules 10 in the following manner. An update sequence is initiated at secondary computer 30. In accordance with this update sequence, a module address and associated updated product information is retrieved from store computer 32, transformed into an analog signal, and sent to transmitter/receiver 24. At transmitter/receiver 24, the infrared signal is transmitted from transmitter/receiver 24 either directly to a plurality of modules 10, or indirectly to modules 10 via receiver/retransmitter ("satellite") 26.

Each product on sale will have associated with it at least one module 10, and all modules 10 associated with any one particular product will typically have a unique stored module address code. In the typical situation, only one module 10 will be associated with any one particular product, but it is possible that several such modules 10 could be so associated where a large inventory of the particular product is on the stores, shelves usually only one module 10 will be able to match the received address to an address that has been stored in the module. The module that makes the match between the received address and its stored module address is enabled to store and display the updated product information, while the remaining modules are unaffected.

Optionally, a link 38 can be maintained between regional computer 36 and secondary computer 30, such that an updating sequence, addresses and associated pricing information can be transmitted directly 0 secondary computer 30. Secondary computer 30 would then be enabled to begin sequentially transmitting the new pricing information via link 28 to transmitter 24, as well as possibly loading the information into store computer 32 for check-out and records purposes.

A module 40 that is similar in many respects to modules 10 may further be employed to control a utility device such as a food refrigerator or a freezer case 42. Device 42 may instead consist of an air conditioner, lighting, or any device or appliance where control and feedback is desirable. Like module 10, module 40 communicates with transmitter/receiver 24 via a preferably infrared signal 41. The communication may be made through receiver/retransmitter 26 depending on strength-of-signal requirements. Where a signal 41 can be established directly to a transmitter/receiver 24, receiver/ retransmitter 26 would not be necessary.

Module 40 is connected as by a hardwire—5 connection 44 to a sensor and control device 46. sensor and control device 46 is in turn connected to controlled device 42. Connection 44 may be either a digital or an analog connection. Where controlled device 42 for instance is a freezer case, one element that could be controlled is the freezer's refrigerant compressor motor. The temperature of the freezer case would be sensed by sensor and control device 46, and this would periodically be relayed via control module 40, receiver/transmitter 26 (where necessary) and receiver/transmitter 24 to secondary computer 30. When the temperature of the case exceeded a certain limit, secondary computer 30 would send an instruction through transmitter 24 and optionally receiver/ retransmitter 26 back to control module 40. Control module 40 would recognize the address associated with this instruction as matching its own module address, and would consequently accept and relay this instruction through control device 46 in order to turn the motor on. In this way, on-floor electrical devices such as freezer cases can be controlled from a central point with the same system that updates pricing information. The control of energy-consuming devices from a store computer or a regional computer has the advantage of enabling the regulation of overall store power consumption, and controlling temperature settings and the like from a single location.

Referring now to FIG. 2a, one of several possible physical embodiments of module 10 is illustrated. Module 10 preferably has a case 48, at least a portion of which is composed of a plastic or other material that is at least partly infrared-transparent. The type and thickness of the case material should be selected such that infrared signals are able to be sensed by the modules infrared receiving diode or phototransistor (described below). Suitable infrared transparent plastics are conventionally used in such devices as remote television controls. As shown, it is preferred that the infrared diode(s) or phototransistor(s) of the module not be exposed to the exterior, as this could cause premature failure due to fluids or rough treatment.

An opening 50 is made in case 48 for display 16, which preferably is of the liquid crystal variety. Display 16 preferably has two or more matrixes 52 and 54 of different heights in order to create multiple-height graphic and alphanumeric displays. Typically, matrix 52 is used to display the price of the item, while matrix 54 is used to display other data such as price per ounce. As shown in FIG. 1, display 16 can alternatively display a legend such as "SALE", either continuously or in alternation with pricing information. Matrices 52 and 54 may be of the dot matrix or segment type.

Case 48 also preferably has space for a product label 56, on which more permanent information can be displayed. Such relatively permanent information can include, for example, a picture of the product container or other graphic, a written description of the product, and a UPC or EAN bar code. Module 10 thus allows the simultaneous display of long-lasting information, which is changed out only on a very infrequent basis, and more ephemeral pricing and sale information which may change daily.

Module 10 further preferably includes a gripping element 58, the structure and function of which are more clearly illustrated in FIGS. 2b and 2c. Referring first to FIG. 2b, gripping element 58 can be fabricated out of a tough, elastic material such as flat spring steel, and can have a plurality of gripping elements or teeth 60 that project beyond the vertical limits of case 48. Gripping element 58 is attached to case 48 as by means of a plastic rivet 62, which preferably is integrally formed with case 48. Element 58 is provided with a bore 64 through which rivet 62 is inserted. Rivet 62 is then deformed by heat to produce head 67, locking element 58 in place. Gripping element 58 is in general elliptical in shape. A top side 65 arcs up beyond the upper limit of case 48 and then back downwardly to terminate in end 66 (shown in phantom). End 66 is received within a passage 68 formed in block 70, which in turn can be formed as an integral part of case 48. Passage 68 is formed so as to permit the free movement of end 66 therethrough. A lower portion 72 of gripping element 58 is formed in mirror image to upper portion 64, and likewise terminates in an end 74. Passage 68 permits the free movements of end 74 relative thereto. Gripping element 58 is so fashioned that it can be squeezed vertically to the vertical limits of case 48, the element then springing back to the dimensions shown when released.

Referring to FIG. 2c, the installation of module 10 onto a channel 12 is illustrated as using gripping element 58. Gripping element 58 has been released outwardly in order to occupy recesses 76 and 78 of channel 12. In order to originally install or later remove module 10, a relatively flat, narrow tool (not shown) may be inserted behind module 10 in order to depress gripping element 58 below a top edge 80 of channel 12 while module 10 is being removed. Thus, gripping element 58 prevents module 10 from being casually removed, but at the same time allows easy removal by store personnel.

The illustrated gripping element 58 is only exemplary. Other attachment means, such as machine screws or other gripping elements, may be used in accordance with the invention.

Figure 3:
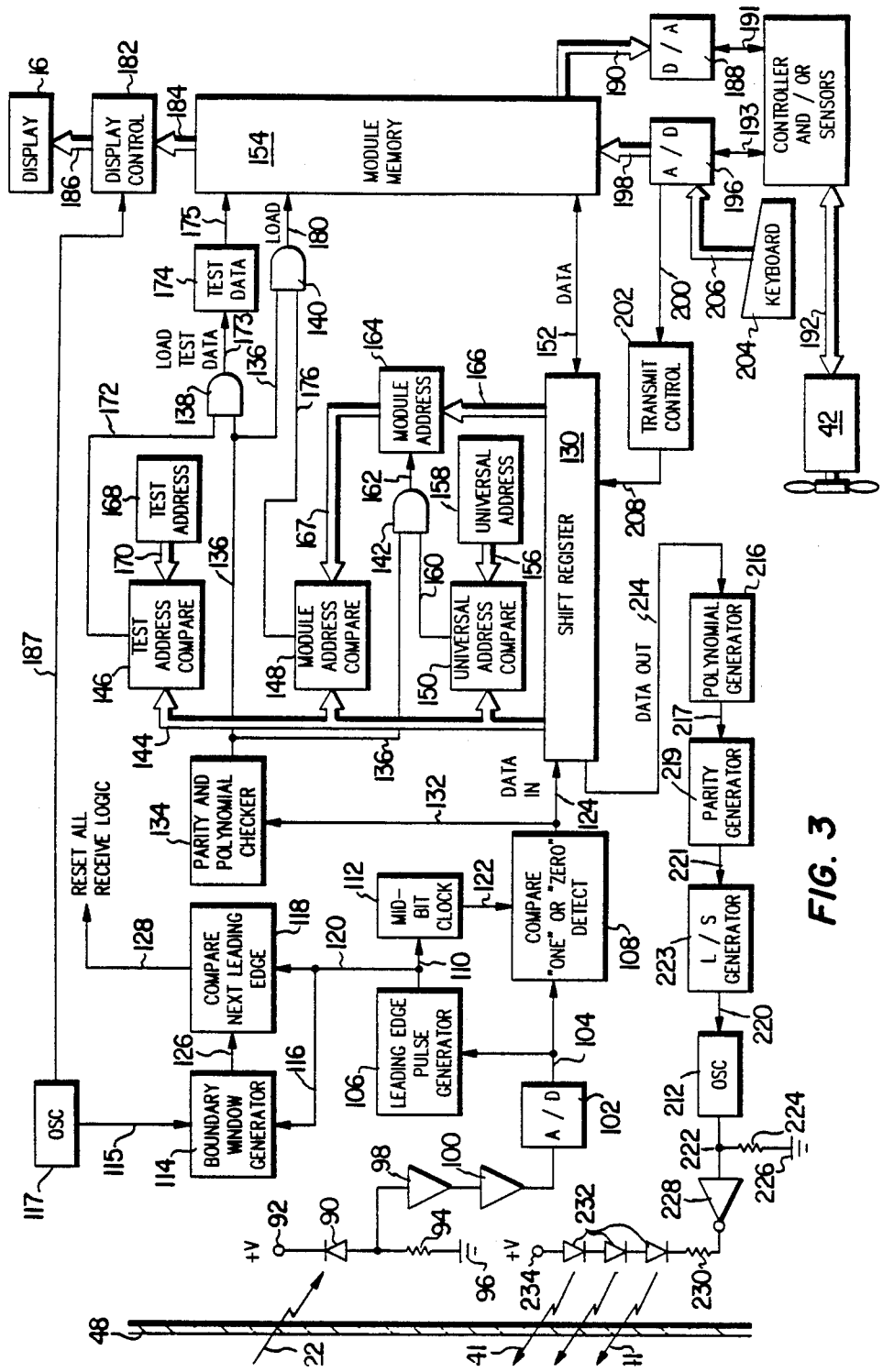
FIG. 3 is a schematic electrical block diagram of the electronic circuitry incorporated into one embodiment of an electronic display and control module according to the invention.

Referring now to FIG. 3, one possible embodiment of electronic circuitry incorporated into module 10 is schematically illustrated. The invention may also be reduced to practice using conventional electronic circuits other than those described. An infrared receiver diode 90 is mounted adjacent case 48. At least that portion of case 48 that is adjacent to receiver diode 90 should be constructed of an infrared transmissive aerial, such that signal 22 will be able to penetrate case 48 with sufficient magnitude to be received by receiver diode 90. Receiver diode 90 is connected between a voltage source 92 and a resistor 94. Resistor 94 is further connected to a voltage reference 96 such as ground. The received infrared signal passes through an amplifier 98, and then through a multistage band pass filter 100. The amplified and filtered signal is then fed into an input of an analog/digital converter 102. Analog/digital converter 102 produces a pulse signal on output line 104. The signal on line 104 is fed to a leading edge pulse generator 106 and a one/zero detector 108. Long pulses on line 104 represent "ones", and short pulses represent "zeros".

Leading edge pulse generator 106 operates to produce a leading edge pulse, which is output on line 110. The leading pulse is supplied on line 110 to a mid-bit clock 112, and also to a boundary window generator 114 via a line 116 and to a "next edge" comparator 118 via a line 120.

The leading edge pulse on line 110 is used to start a mid-bit clock 12. Mid-bit clock 12 generates a sample pulse which is output on a line 122. The sample pulse on line 122 is input into a "one"/"zero" detector 108 which uses the sample pulse on line 122 to sample the signal on line 103 to determine if it is in a high or low state. If the mid-bit value of the signal on line 104 is high, then the sensed bit will be assigned a "one"; if, on the other hand, the sensed bit is low, the bit will be assigned a "zero". The result appears as data on the "one"/"zero" detect output line 124.

The leading edge pulse is also used to test the validity of the received data. If true data is being received, the next pulse should be received within a certain period. Boundary window generator 114 receives a clock pulse on line 115 from an oscillator 117. Boundary window generator 114 sets up the time boundaries for each pulse received on line 116. The time boundaries are communicated to next edge comparator 118 via a line 126. Comparator 118 compares the boundary limits to the time at which the next leading edge pulse is received on line 120. If the pulse is received outside the "window" set up by boundary window generator 114, the output appearing on line 128 will indicate that received data is invalid. The signal on line 128 is used to reset all of the "receive" logic, including the shift register (described below).

Line 124 inputs the data from one/zero detector 108 into a shift register 130, and a line 132 inputs the data signal into a parity and polynomial checker 134. If the parity of incoming data is good, an appropriate signal will be generated on a "data valid" line 136. This signal is supplied to AND gates 138, 140 and 142.

Shift register 130 accepts data on line 124. Shift register 130 operates to store the address and appended pricing information while it is being compared to each of three stored addresses. Shift register 130 is connected by a bus 144 to a test address comparator 146, a module address comparator 148, and a universal address comparator 150. Shift register 130 is connected by a data line 152 to a module memory 154. A bus 156 supplies comparator 150 with a universal address from a universal address register 158. Universal address comparator 150 has an output 160 that is connected to AND gate 142. AND gate 142 produces a load enable signal on a line 162 that is input into a module address register 164. A signal on line 162 enables register 164 to accept a module address from register 130 via an address bus 166. Module address register 164 supplies its stored module address to comparator 148 via a bus 167.

Test address comparator 146 receives a test address from a test address register 168 via a bus 170. Comparator 146 has an output 172 that is input into AAm gate 138. Gate 138 in turn supplies an output 173 to a test data module 174. Test data module 174 outputs a data line 175 that is fed as an input into module memory 154.

The address in shift register 130 is compared by module address comparator 148 to the address stored in module address register 164. If a match is ascertained, address comparator 148 produces a VALID MODULE DATA signal on an output line 176, which in turn is fed as an input into AND gate 140. If the data has been determined valid by checker 134, a LOAD signal will be sent on a line 180 to module memory 154. The register address stored in shift register 130 is further compared against a universal address stored in universal address register 158 by universal address comparator 150. If these addresses match, the address portion of the information stored in 10 shift register 130 is loaded via bus 160 into module address register 164. This is done with the aid of a load enable signal output on line 162.

Finally, the address in shift register 130 is compared against a test address stored in test address register 168 by test address comparator 146. If a match is made with the test address, a signal is output on line 172 to AND gate 138. If checker 134 has determined that the data is valid, AND gate 138 will transmit a LOAD TEST DATA signal via line 173 to test data module 174. Test data module 174 stores a test routine that is transmitted via line 175 to module memory 154. The test routine exercises the various peripherals connected to module memory 154. Where the address in shift register 130 and the 25 address stored in module address register 164 are matched by module address comparator 148, the data is transmitted via data line 152 to module memory 154. These data are in turn communicated to a display controller 182 via a bus 184, which in turn controls display 16 via a bus 186. Display controller further receives a clock signal via line 187 from oscillator 117. The data, which may contain pricing information and alternate information, will then appear on display 16.

Module 10 may also be used to control a working device in the store, such as an on-floor freezer case. In this instance, module memory 154 will communicate to a digital/analog interface 188 via a bus 190. Digital/analog interface 188 in turn transmits control data to a controller 191, which in turn controls the function of device 42 via link 192. Controller 191 may also have one or more sensors for sensing the function of device 42, and the data sensed thereby are communicated to an analog/digital interface 196 by a line 193. In the instance of a freezer case, control link 192 would send a signal to the freezer case in order to turn on or off a compressor motor in order to regulate the case's temperature.

Analog/digital interface 196 supplies device data to memory 154 via a bus 198. Analog/digital interface 196 further sends a signal on control line 200 to a transmit controller 202. Memory 154 may optionally receive input from a keyboard 204 via a bus 206. A/D interface 196 and bus 198. Keyboard 204 would have at least one key.

Transmit controller 202 further is connected to shift register 130 via a control line 208. Where a module 10 is required to transmit information back to the store computer, data line 152 is operable to transmit data from the module memory 154 back to the shift register 130, as enabled by transmit controller 202. The data is then shifted out on DATA OUT line 214, which in turn is connected to a polynomial generator 216. Polynomial generator 216 in turn sends its output via a line 217 to a parity generator 219. Polynomial generator 216 and parity generator 219 add parity bits and a polynomial expression to the data for validation purposes. Parity generator 219 transmits the digital data via a line 221 to a long short generator 223. Long/short generator 223 converts the data to a series of long and short pulses, and produces a long/short signal on output line 220. Output line 220 is fed into an oscillator 212, which produces a twenty-five kilohertz-modulated signal on output line 222. Output line 222 is connected via a resistor 224 to ground source 226. Output line 222 is further connected to an inverter 228. The signal from inverter 228 passes through a resistor 230 to a plurality of transmitting infrared diodes 232, which are connected in series. Diodes 232 may be replaced with other transmitting means such as infrared phototransistors. Infrared transmitting diodes 232 are in turn connected to a voltage source 234, which preferably is derived from the same voltage source as voltage source 92. Infrared transmitting diodes 232 are operable to transmit infrared signals 41 through infrared-transmissive case 48 to either receiver/retransmitter 26 or directly to an infrared transmitter/receiver 24.

Turning now to FIG. 4, an infrared in-store transmission system is schematically illustrated. Data from the store primary computer or from a regional or national headquarters computer is fed to a secondary computer via link 250. A digital signal, including a module address and associated pricing information, is transmitted via line 252 to a polynomial generator 254. Polynomial generator 254 in turn communicates the data through line 256 to a long/short generator 258 which converts the digital data into a series of long and short pulses, long pulses representing "ones" and short pulses representing "zeros". The long/short signal is preferably sent via line 260 to a twenty-five kilohertz infrared oscillator 262. The resulting infrared signal is transmitted via line 264 and drivers 266 through resistors 268 to a plurality of infrared transmitting diodes 270. Diodes 270 can be replaced by phototransistors. A plurality of diodes 270 are preferably each connected in series, as illustrated, to a voltage source 272. Diodes 270 are preferably arranged so as to provide an even distribution of the transmitted signal, such as in a conical form inside of conical infrared transmitter/receiver 24. In this way, the resultant infrared signal can be focused on a particular zone of the store. Referring now to FIG. 5, a possible arrangement of infrared transmitters 24 within a store is illustrated, showing zone coverage. Each infrared transmitter 24 is provided in order to transmit infrared signals through a plurality of cones 280–284, one cone for each infrared transmitter 24. Each cone 280–284 represents a region where the signal is strong enough to be received by a module 10 therein. Cone 280 transmits to a first plurality of modules, cone 284 transmits to a second, distinct plurality of modules, and cone 282 encompasses modules both within cones 280 and 284, and further modules within neither cone. As shown, transmitters 24 provide complete coverage to all modules in the store.

In an alternate embodiment, cones 280–284 have no overlap, but transmit to entirely distinct regions. This alternate embodiment has particular application to a module whose primary purpose is to advertise goods. Such a module would, for instance, be mounted to a shopping cart. As it traversed different zones, the information displayed on its display would change accordingly, even though its address would remain the same. This is because different transmitters 24 transmit the same address portion of the signal, but a different data portion. Therefore, different advertising could be directed at the module depending on where the module was in the store.

In summary, a novel electronic pricing and advertising system has been disclosed. The disclosed system obviates the need for a radio frequency or hardwired connection to the individual display modules, and instead uses an infrared signal system in order to transmit pricing or product information to the modules. The modules are each capable of recognizing and storing product information addressed to them, and in certain embodiments can transmit information relating to connected devices back to a central computer. In this way, digital pricing information, as appearing in the form of UPC or EAN codes, can be fully exploited and manually-applied shelf displays can be avoided.

While the invention is illustrated by the embodiments in the above detailed description, it is not limited to these embodiments but rather only it by the limited to these embodiments but rather only by the scope and the spirit of the claims which follow.

What is claimed is:

1. A method for displaying product information at locations proximate to associated products, comprising the steps of:

mounting a plurality of electronic display modules at locations proximate to respective different goods;

programming each module with a module address;

forming a signal comprising address and data parts, the address part representing a module address and the data part representing product information for the module address;

broadcasting a non-pulsed signal having a band width selected from the spectral band consisting of infrared and visible light;

receiving said signal by a plurality of receiving modules, the receiving modules comprising at least some of the electronic display modules;

decoding the address part of said signal by each receiving module into a received address;

comparing the received address to the module address for each receiving module;

matching the received address to the module address in at least one addressed module among the receiving modules;

for each addressed module, decoding the data part of the signal into product information;

storing the decoding product information in a memory of the addressed module; and displaying the stored product information on a display of the addressed module responsive to said step of matching.

2. A method for displaying product information at locations proximate to associated products, comprising the steps of:

mounting a plurality of electronic display modules at locations proximate to respective different products;

encoding product information for selected ones of the modules into an infrared signal;

programming each module with a module address;

forming a signal comprising address and data parts, the address part representing a module address and the data part representing product information to be displayed on at least an addressed one of the modules;

aerially broadcasting said signal as pulsed electromagnetic energy selected from the spectral band consisting of infrared and light to the modules from a remote transmitter;

receiving said signal by a plurality of receiving modules through housings of the modules, each housing being entirely transparent to said electromagnetic energy, the receiving modules comprising at least some of the electronic display modules;

decoding the address part of said signal by each receiving module into a received address;

comparing the received address to a module address of the module;

matching the received address to the module address in at least one addressed module among the received modules;

for each addressed module, decoding the data part of the signal into product information;

storing the decoded product information in a memory of the addressed module; and displaying the stored product information on a display of the addressed module responsive to said step of matching.

3. A method for displaying product information at locations proximate to associated products, comprising the steps of:

mounting a plurality of electronic display modules at locations proximate to respective different goods;

programming each module with a module address;

forming a signal comprising address and data parts, the address part representing a module address and the data part representing product information for the module addressed;

aerially broadcasting said signal as pulsed electromagnetic energy selected from the spectral band consisting of infrared and light to the modules from a remote transmitter;

receiving said signal by a plurality of receiving modules, the receiving modules comprising at least some of the electronic display modules;

decoding the address part of said signal by each receiving module into a received address;

comparing the received address to the module address for each receiving module;

matching the received address to the module address in at least one addressed module among the receiving modules;

for each addressed module, decoding the data part of the signal into product information;

storing the decoded product information in a memory of the addressed module;

displaying the stored product information on a display of the addressed module responsive to the step of matching;

transmitting a test address from a programming module moved near a selected module, such that non-selected modules do not receive the test address;

recognizing said test address by said selected module response to said step of recognizing executing a test routine; and displaying the results of said test routine on the selected module's display.

4. A system for electronically displaying product information, comprising:

at least one electronic display module for displaying product information disposed in an area including at least first and second zones;

means for programming a module address of said module;

means for forming first and second signals, the first signal comprising an address part and a first data part, the address part representing a module address and the first data part representing first product information for the module address, the second signal comprising said address part and a second data part representing second product information;

remote means for aerially transmitting the first signal as electromagnetic energy selected from the band consisting of infrared and light to the first zone;

remote means for aerially transmitting the second signal as electromagnetic energy selected from the band consisting of infrared and light to the second zone;

means in said module for receiving one of said first and second signals, means for decoding the address part of said one signal into a received address, and means for comparing the received address to the module address;

means in said module for decoding the data part of said one signal into product information, means in said module for storing and displaying the decoded product information response to obtaining a match between the received address and the module address;

said module initially disposed in said first zone and decoding a received address from said address part of said first signal, decoding said first data part into said first product information, and comparing said received address with said module address, said module storing and displaying the first product information responsive to matching the first received address with said module address;

said module operable to be moved into said second zone, said module then decoding said received address from said address part of said second signal, decoding the second data part into said second product information, comparing the address part of said second signal to its module address, and storing and displaying said second product information responsive to matching the received address with its module address; and means for entering product information for storage and display other than by aerial transmission of a signal of pulsed electromagnetic energy.

5. A system for electronically displaying product information, comprising:

at least one electronic display module for displaying product information disposed in an area including at least first and second zones;

means for programming a module address of said module;

means for simultaneously storing a plurality of sets of product information;

means for forming first and second signals, the first signal comprising an address part and a first data part, the address part representing a module address and the first data part representing first product information for the module address, the second signal comprising said address part and a second data part representing second product information;

remote means for aerially transmitting the first signal as electromagnetic energy selected from the band consisting of infrared and light to the first zone;

remote means for aerially transmitting the second signal as electromagnetic energy selected from the band consisting of infrared and light to the second zone;

means in said module for receiving one of said first and second signals, means for decoding the address part of said one signal into a received address, and means for comparing the received address to the module address;

means in said module for decoding the data part of said one signal into product information, means in said module for storing and for displaying the decoded product information responsive to obtaining a match between the received address and the module address;

said module initially disposed in said first zone and decoding a received address from said address part of said first signal, decoding said first data part into said first product information, and comparing said received address with said module address, said module storing and displaying the first product information responsive to matching the first received address with said module address; and said module operable to be moved into said second zone, said module then decoding said received address from said address part of said second signal, decoding the second data part into said second product information, comparing the address part of said second signal to its module address, and storing and displaying said second product information responsive to matching the received address with its module address.

6. A system for electronically displaying product information, comprising:
   at least one electronic display module for displaying product information disposed in an area including at least first and second zones;
   means for programming a module address of said module;
   means for simultaneously storing at least first and second sets of product information;
   means for forming first and second signals, the first signal comprising an address part and a first data part, the address part representing a module address, the second signal comprising said address part and a second data part, said data parts of said first and second signals representing respective data triggers which respectively cause the display of said first or second set of product information previously stored in said module;
   remote means for aerially transmitting the first signal as electromagnetic energy selected from the band consisting of infrared and light to the first zone;
   remote means for aerially transmitting the second signal as electromagnetic energy selected from the band consisting of infrared and light to the second zone;
   means in said module for receiving one of said first and second signals, means for decoding the address part of said one signal into a received address, and means for comparing the received address to the module address;
   means in said module for decoding the data part of said one signal to trigger the display of a respective set of product information, responsive to obtaining a match between the received address and the module address;
   said module initially disposed in said first zone and decoding a received address from said address part of said first signal, and comparing said received address with said module address, said module decoding the first data part to trigger the display of the first product information responsive to matching the first received address with said module address; and
   said module operable to be moved into said second zone, said module then decoding said received address from said address part of said second signal, comparing the address part of said second signal to its module address, and decoding the second data part to trigger the display of said second product information responsive to matching the received address with its module address.

7. A system for electronically displaying product information, comprising:
   at least one electronic display module for displaying product information disposed in an area including at least first and second zones;
   means for programming a module address of said module;
   means for simultaneously storing at least first and second sets of product information;
   means for forming first and second signals, the first signal comprising an address part and a first data part, the address part representing a module address, the second signal comprising said address part and a second data part, said data parts of said first and second signals representing respective data triggers which respectively cause the display of said first or second set of product information previously stored in said module;
   means for manually entering said data trigger into said module;
   remote means for aerially transmitting the first signal as electromagnetic energy selected from the band consisting of infrared and light to the first zone;
   remote means for aerially transmitting the second signal as electromagnetic energy selected from the band consisting of infrared and light to the second zone;
   means in said module for receiving one of said first and second signals, means for decoding the address part of said one signal into a received address, and means for comparing the received address to the module address;
   means in said module for decoding the data part of said one signal to trigger the display of a respective one of said previously stored set of product information responsive to obtaining a match between the received address and the module address;
   said module initially disposed in said first zone and decoding a received address from said address part of said first signal, and comparing said received address with said module address, said module decoding the first data part to trigger the display of the first set of product information responsive to matching the first received address with said module address; and
   said module operable to be moved into said second zone, said module then decoding said received address from said address part of said second signal, comparing the address part of said second signal to its module address, and decoding the second data part to trigger the display of said second set of product information responsive to matching the received address with its module address.

8. A system for electronically displaying product information, comprising:
   at least one electronic display module for displaying product information disposed in an area including at least first and second zones;
   means for programming a module address of said module;
   means for forming first and second signals, the first signal comprising an address part and a first data part, the address part representing a module address and the first data part representing first product information for the module address, the second signal comprising said address part and a second data part representing second product information;
   remote means for aerially transmitting the first signal as electromagnetic energy selected from the band consisting of infrared and light to the first zone;
   remote means for aerially transmitting the second signal as electromagnetic energy selected from the band consisting of infrared and light to the second zone;
   means in said module for receiving one of said first and second signals, means for decoding the address part of said one signal into a received address, and means for comparing the received address to the module address;
   means in said module for decoding the data part of said one signal into product information, means in said module for storing and for displaying the decoded product information responsive to obtaining a match between the received address and the module address;

said module initially disposed in said first zone and decoding a received address from said address part of said first signal, decoding said first data part into said first product information, and comparing said received address with said module address, said module storing and displaying the first product information responsive to matching the first received address with said module address; and said module operable to be moved into said second zone, said module then decoding said received address from said address part of said second signal, decoding the second data part into said second product information, comparing the address part of said second signal to its module address, and storing and displaying said second product information responsive to matching the received address with its module address; and means in said module for making a tangible record of said stored product information.

* * * * *

UNITED STATES PATENT AND TRADEMARK OFFICE
CERTIFICATE OF CORRECTION

PATENT NO. : 4,962,466

DATED : October 9, 1990

INVENTOR(S) : Michael S. Revesz, et al.

It is certified that error appears in the above-identified patent and that said Letters Patent is hereby corrected as shown below:

Abstract, line 5, "adderess" should be --address--.

Col. 11, line 66, "response" should be --responsive--.

Signed and Sealed this

Twenty-eighth Day of April, 1992

Attest:

HARRY F. MANBECK, JR.

*Attesting Officer*          *Commissioner of Patents and Trademarks*